US010748187B2

(12) United States Patent
Reis et al.

(10) Patent No.: US 10,748,187 B2
(45) Date of Patent: *Aug. 18, 2020

(54) FOLLOWING CONTENT PROVIDERS IN A SOCIAL CONTEXT

(71) Applicant: Google LLC, Mountain View, CA (US)

(72) Inventors: Davi De Castro Reis, Belo Horizonte (BR); Christian Oestlien, New York, NY (US); Eider Silva de Oliveira, Belo Horizonte (BR); Marcus A. Leal, Belo Horizonte (BR)

(73) Assignee: Google LLC, Mountain View, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/840,075

(22) Filed: Dec. 13, 2017

(65) Prior Publication Data

US 2018/0101868 A1  Apr. 12, 2018

Related U.S. Application Data

(63) Continuation of application No. 14/757,539, filed on Dec. 23, 2015, now Pat. No. 9,865,006, which is a (Continued)

(51) Int. Cl.
*G06F 15/16* (2006.01)
*G06Q 30/02* (2012.01)
(Continued)

(52) U.S. Cl.
CPC ....... *G06Q 30/0258* (2013.01); *G06F 16/958* (2019.01); *G06Q 30/0241* (2013.01);
(Continued)

(58) Field of Classification Search
CPC .......... G06Q 30/0258; G06Q 30/0241; G06Q 30/0269; G06Q 30/0277; G06Q 50/01; G06F 16/958
See application file for complete search history.

(56) References Cited

U.S. PATENT DOCUMENTS 8,583,480 B2  11/2013 Byrne
8,732,241 B2  5/2014 Reis et al.
(Continued)

FOREIGN PATENT DOCUMENTS

KR  10-2009-0090818  8/2003
KR  10-2010-0104627  9/2010

OTHER PUBLICATIONS

Notification of Transmittal of the International Search Report and the Written Opinion of the International Searching Authority, or the Declaration issued in PCT/US2011/067763 dated Aug. 27, 2012, 8 pages.
(Continued)

*Primary Examiner* — Philip B Tran
(74) *Attorney, Agent, or Firm* — Fish & Richardson P.C.

(57) ABSTRACT

In general, a method for providing content to a user includes providing a content item to a user responsive to a received request. The content item is displayed to the user in a slot associated with a third party content site. The content item includes a first annotation providing information for or about re-publishing the content item. A request is received from the user to follow a content provider associated with the content item. The user is designated as being interested in updated content from the content provider. Designating the user includes presenting information about the user to one or more of the content provider or a social application that includes a content provider presence so as to allow for updates associated with the content provider to be followed by the user.

17 Claims, 8 Drawing Sheets

Related U.S. Application Data continuation of application No. 14/258,496, filed on Apr. 22, 2014, now Pat. No. 9,256,891, which is a continuation of application No. 13/339,501, filed on Dec. 29, 2011, now Pat. No. 8,732,241.

(60) Provisional application No. 61/428,823, filed on Dec. 30, 2010.

(51) Int. Cl.
*G06F 16/958* (2019.01)
*G06Q 50/00* (2012.01)

(52) U.S. Cl.
CPC ..... *G06Q 30/0269* (2013.01); *G06Q 30/0277* (2013.01); *G06Q 50/01* (2013.01)

(56) References Cited

U.S. PATENT DOCUMENTS

| | | | |
|---|---|---|---|
| 9,256,891 B2 | 2/2016 | Reis | |
| 9,865,006 B2 * | 1/2018 | Reis | G06Q 30/0241 |
| 2003/0229893 A1 | 12/2003 | Sgaraglino | |
| 2006/0080166 A1 | 4/2006 | Takahashi | |
| 2007/0255965 A1 | 11/2007 | McGucken | |
| 2009/0070412 A1 | 3/2009 | D'Angelo et al. | |
| 2011/0083101 A1 | 4/2011 | Sharon et al. | |
| 2011/0218847 A1 | 9/2011 | Razzaque et al. | |
| 2011/0231240 A1 | 9/2011 | Schoen et al. | |
| 2012/0066037 A1 | 3/2012 | Glen | |
| 2012/0084160 A1 | 4/2012 | Badros et al. | |
| 2012/0116897 A1 | 5/2012 | Klinger et al. | |
| 2013/0080526 A1 | 3/2013 | Gill et al. | |

OTHER PUBLICATIONS

Notice of Allowance issued in U.S. Appl. No. 13/339,501 dated Jan. 21, 2014, 13 pages.
Office Action issued in U.S. Appl. No. 14/258,496 dated Jul. 8, 2015, 17 pages.
Notice of Allowance issued in U.S. Appl. No. 14/258,496 dated Oct. 22, 2015, 7 pages.
Office Action issued in U.S. Appl. No. 14/757,539, dated Dec. 30, 2016, 23 pages.
Office Action issued in U.S. Appl. No. 14/757,539, dated Jun. 30, 2017, 24 pages.
Notice of Allowance issued in U.S. Appl. No. 14/757,539, dated Oct. 11, 2017, 7 pages.

* cited by examiner

FOLLOWING CONTENT PROVIDERS IN A SOCIAL CONTEXT

CROSS-REFERENCE TO RELATED APPLICATION

This application is a continuation of U.S. patent application Ser. No. 14/757,539, filed on Dec. 23, 2015, which is a continuation of Ser. No. 14/258,496, filed on Apr. 22, 2014, which is a continuation of U.S. patent application Ser. No. 13/339,501, filed on Dec. 29, 2011, which claims the benefit of U.S. Provisional Application Ser. No. 61/428,823, filed on Dec. 30, 2010, the entirety of which are incorporated by reference.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for content items (e.g., advertisements, sometimes referred to as "ads") to be provided with the resources. For example, a web page can include content item slots in which content items can be presented. These content item slots can be defined in the web page or defined for presentation with a web page, for example, in a pop-up window.

Content item slots can be allocated to content providers through an auction. For example, content providers can provide bids specifying amounts that the content providers are respectively willing to pay for presentation of their content items. In turn, an auction can be performed and the content item slots can be allocated to content providers according, among other things, to their bids and/or the relevance of the content item to content presented on a page hosting the slot or a request that is received for the content item.

SUMMARY

In general, one innovative aspect of the subject matter described in this specification can be implemented in methods for providing content to a user, the method including providing a content item to a user responsive to a received request, the content item being displayed to the user in a slot associated with a third party content site, the content item including a first annotation providing information for or about re-publishing the content item, receiving a request from the user to follow a content provider associated with the content item, and designating the user as being interested in updated content from the content provider, the designating including presenting information about the user to one or more of the content provider or a social application that includes a content provider presence so as to allow for updates associated with the content provider to be followed by the user.

These and other implementations can each optionally include one or more of the following features. An indication is received from the user to re-publish the content item to one or more users or groups associated with the user in a social context. The content item is provided as part of an update associated with the user in the social context. The user is presented with an option to follow the content provider after receiving the user indication to re-publish the content item. The request to follow the content provider is received responsive at least in part to the presented option. The first annotation includes an information portion and a control, the control for enabling the user to follow the content provider. The control further enables the user to republish the content item. It is determined whether the user is logged into an account that identifies the user to the social application or the content provider. The user is prompted to log into the account if the user is determined not to be logged into the account. The account is not controllable by the social application. The user is added to a list of users who will receive the updates associated with the content provider. Content is targeted to users based at least in part on content providers that the user is following. The content includes one or more of search results and content items. Targeting content includes determining a context for queries entered by the user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
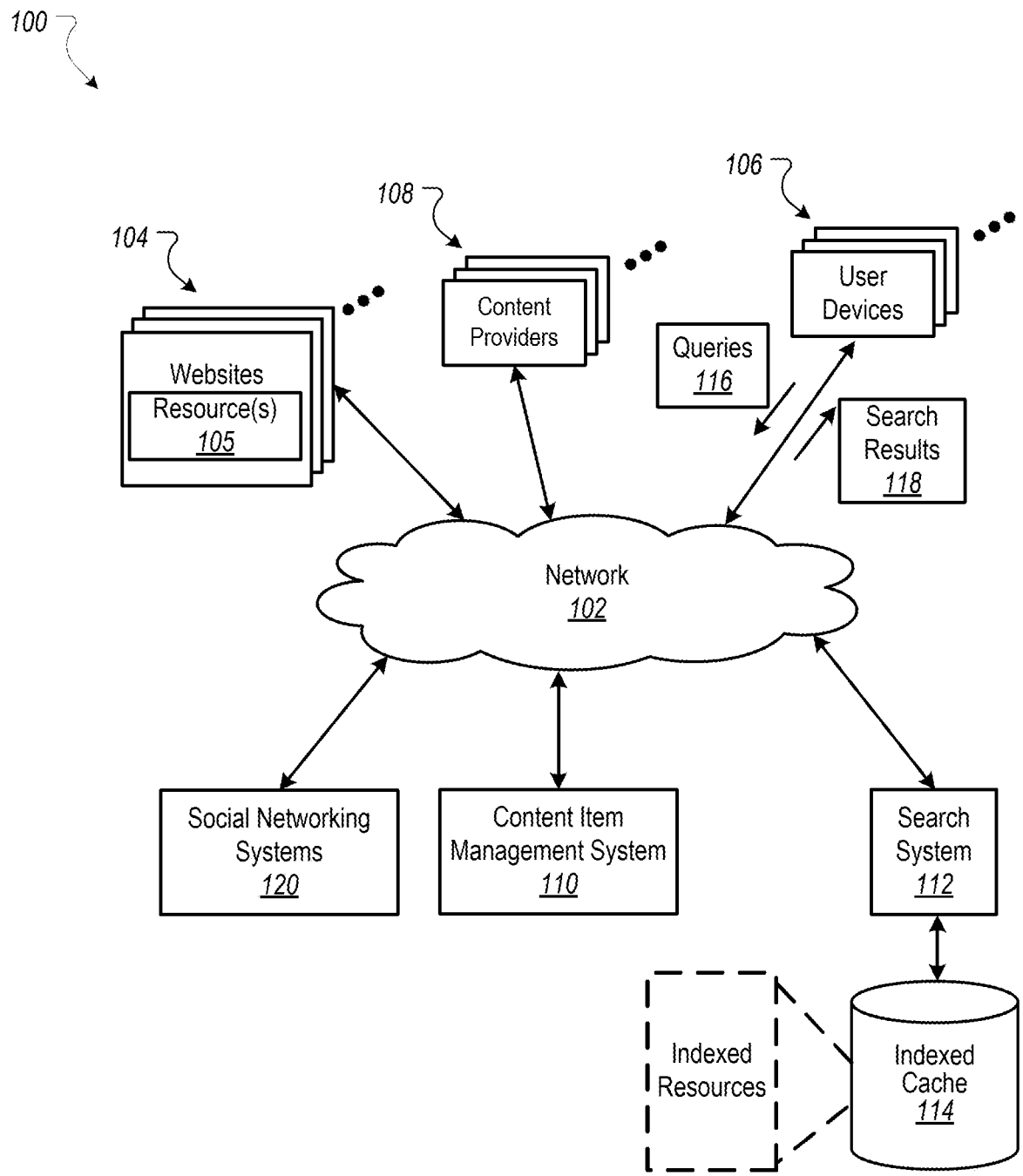
FIG. 1 is a block diagram of an example environment that provides social overlays on ads.

When a user requests on-line content (e.g., a web page or another online resource), content requests can be initiated to request content from a content publisher for presentation on a user device. For example, content publishers can include publishers of web sites or search engines that are publishing search results responsive to a query. One or more additional content items (e.g., ads) can be provided along with the requested content. As a result, the presented content can be, for example, text, images, audio, video, content items (or ads) or other content selected for presentation to the user. In response to each content request received, content can be served, including one or more ads. In some implementations, some ads can include a social component or context.

For example, a content item that is served can include a social overlay that includes social information and tools for propagating social information to others. As a result, users can share ads with others, including friends and family. By sharing a content item, a user can make his preferences known, including providing comments for specific ads, and the comments can be handled in a structured way. Users can also chose to republish a content item in a social context (e.g., in an activity stream in a user's profile on a social networking web site), and can also choose to follow a content provider associated with the content item. By providing the ability for users to republish ads and follow content providers within a social context, ads can be more interesting to users and their social contacts. As a result, more user attention can be captured by the content items, which can result in higher click-through-rates and overall content item effectiveness. Another use and benefit of the social overlays on ads is the ability to capture user feedback. Content providers can capture information (e.g., content item-sharing statistics, etc.) for ads in order to gauge the quality of their ads, the effectiveness of content item campaigns, and the popularity of certain product brands that are featured in ads.

In some implementations, a widget (e.g., a graphical user interface control) can be overlaid on a content item creative that is displayed to Internet users, such as on a third-party web site. The widget can show social annotations that provide information about the specific content item that is being displayed. This information can include, for example, the number of users who liked or that have interacted with the content item, the number of users in a certain geographic region who re-published the content item, and the name of a user's friend who liked a content item, and so on. The widget can also include buttons or other controls that allow the user to designate (i.e., the user likes the content item, the user wants to share the content item, or the user wants to otherwise positively endorse the content item), and comment on a given content item, and, in some implementations (e.g., the exemplary implementations of FIGS. 5 and 6), follow a content provider (e.g., a content provider's profile) in a social network. In some implementations, designating a content item is referred to as "plus one'ing" ("+1'ing") a content item.

Although the examples in this disclosure focus primarily on social overlays used on content items, social overlays can occur on any types of content, including websites or any other resource provided by a content provider. Furthermore, social overlays can be provided on (or embedded within) content or on ads on third-party websites.

FIG. 1 is a block diagram of an example environment 100 that provides social overlays on ads and allows users to follow a content provider. The example environment 100 includes a content item management system 110 that manages content item services (e.g., advertising services) and one or more social networking systems 120 that allow users to interact with other users within a social framework. The example environment 100 includes a network 102, such as a local area network (LAN), a wide area network (WAN), the Internet, or a combination thereof. The network 102 connects websites 104, user devices 106, content providers 108, the content item management system 110, and social networking systems 120. The example environment 100 may include many thousands of websites 104, user devices 106, and content providers 108.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images and sounds, that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content items can be presented. These specified portions of the resource or user display are referred to as content item slots.

To facilitate searching of these resources, the environment can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more content item slots in which content items can be presented.

When a resource 105 or search results 118 are requested by a user device 106, the content item management system 110 receives a request for content items to be provided with the resource 105 or search results 118. The request for content items can include characteristics of the content item slots that are defined for the requested resource or search results page, and can be provided to the content item management system 110.

For example, a reference (e.g., URL) to the resource for which the content item slot is defined, a size of the content item slot, and/or media types that are available for presentation in the content item slot can be provided to the content item management system 110. Similarly, keywords associated with a requested resource ("resource keywords") or a search query 116 for which search results are requested can also be provided to the content item management system 110 to facilitate identification of content items that are relevant to the resource or search query 116.

In some implementations, based on data included in the request for content items, the content item management system 110 can select content items that are eligible to be provided in response to the request ("eligible content items"). For example, eligible content items can include content items having characteristics matching the characteristics of content item slots and that are identified as relevant to specified resource keywords or search queries 116. In some implementations, content items having targeting keywords that match the resource keywords or the search query 116 are selected as eligible content items by the content item management system 110.

A targeting keyword can match a resource keyword or a search query 116 by having the same textual content ("text") as the resource keyword or search query 116. For example, a content item associated with the targeting keyword "beaches" can be an eligible content item for a content item request including the resource keyword "beaches." Similarly, the content item can be selected as an eligible content item for a content item request including the search query "beaches."

The content item management system 110 can select from the eligible content items that are to be provided for presentation in content item slots of a resource or search results page based on results of an auction. For example, the content item management system 110 can receive bids from content providers and allocate the content item slots, based at least in part on the received bids (e.g., based on the highest bidders at the conclusion of the auction). The bids are amounts that the content providers are willing to pay for presentation (or selection) of their content item with a resource or search results page. For example, a bid can specify an amount that a content provider is willing to pay for each 1000 impressions (i.e., presentations) of the content item, referred to as a CPM bid. Alternatively, the bid can specify an amount that the content provider is willing to pay for a selection (i.e., a click-through) of the content item or a "conversion" following selection of the content item. The selected content items can be determined based on the bids alone, or based on the bids of each bidder being multiplied by one or more factors, such as quality scores derived from content item performance, landing page scores, and or other factors. In some implementations, the bids can be based on whether the content item includes social information, such as information that identifies how the user or other users in the user's social network have responded to the content item. For example, the social information can be used to generate a social overlay on the content item.

A conversion occurs when a user performs a particular action related to a content item provided with a resource or search results page. What constitutes a conversion may vary from case-to-case and can be determined in a variety of ways. For example, a conversion may occur when a user clicks on a content item, is referred to a web page, and consummates a purchase there before leaving that web page. A conversion can also be defined by a content provider to be any measurable/observable user action, such as downloading a white paper, navigating to at least a given depth of a website, viewing at least a certain number of web pages, spending at least a predetermined amount of time on a website or web page, registering on a website, sharing a content item with other users within a social network, or commenting upon a content item where the comments are visible to others. Other actions that constitute a conversion can also be used.

The system 100 includes one or more social networking systems 120 that provide functions and tools for users to share information in a social network. For example, a social networking system 120 can be a social networking website that users can use to identify friends and social groups (e.g., circles), send and receive email, post messages and multimedia (e.g. photos, video, audio), track social events, provide updates and so on.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that the no personally identifiable information can be determined for the user, or a user's geographic location may be generalized where location information is obtained (such as to a city, zip code, or state level), so that a particular location of a user cannot be determined.

Figure 2:
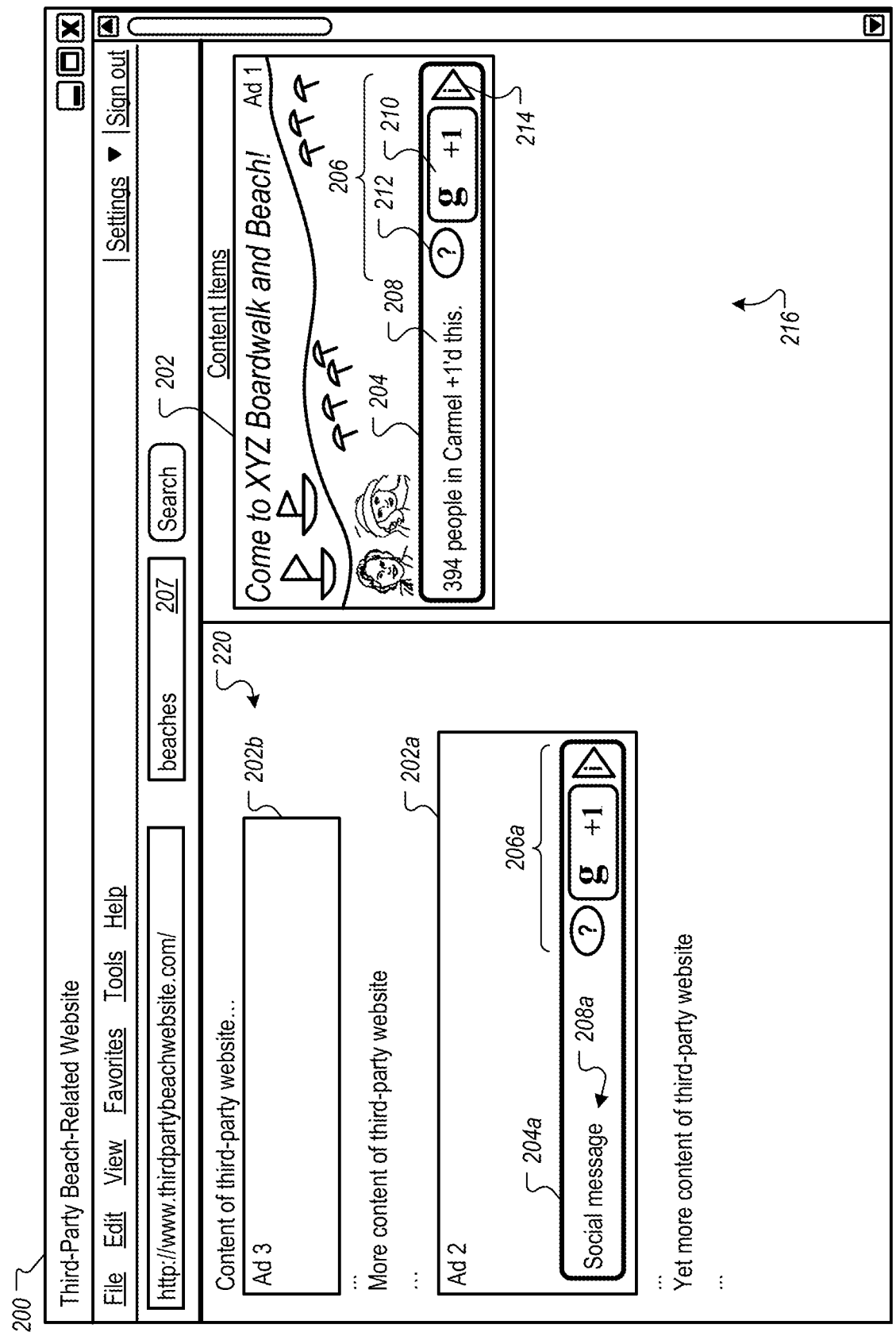
FIG. 2 shows an example user interface that includes a content item with a social overlay and a control for re-publishing the content item.
Figure 3:
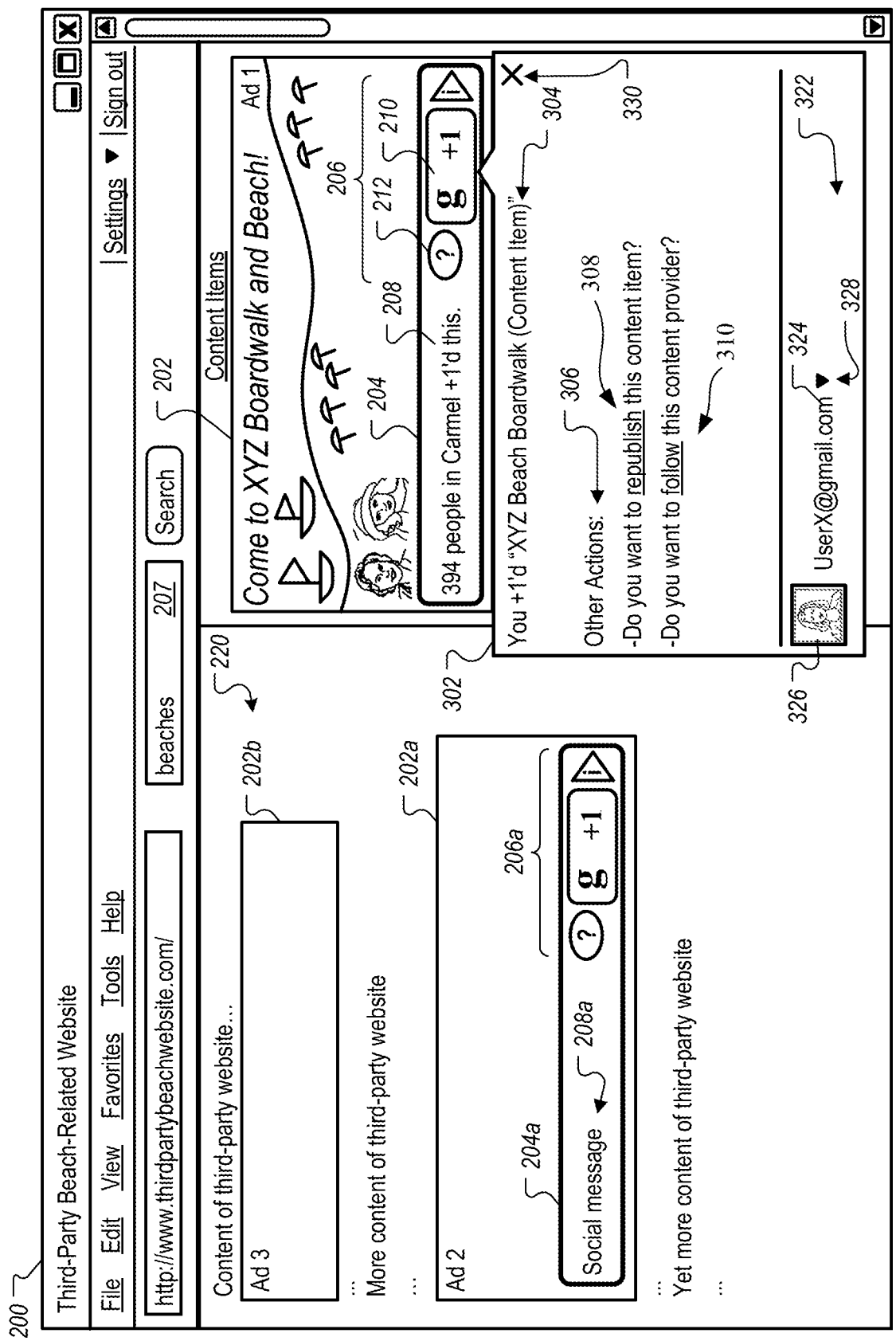
FIG. 3 shows an example details popup for providing detailed information for sharing a content item.
Figure 4:
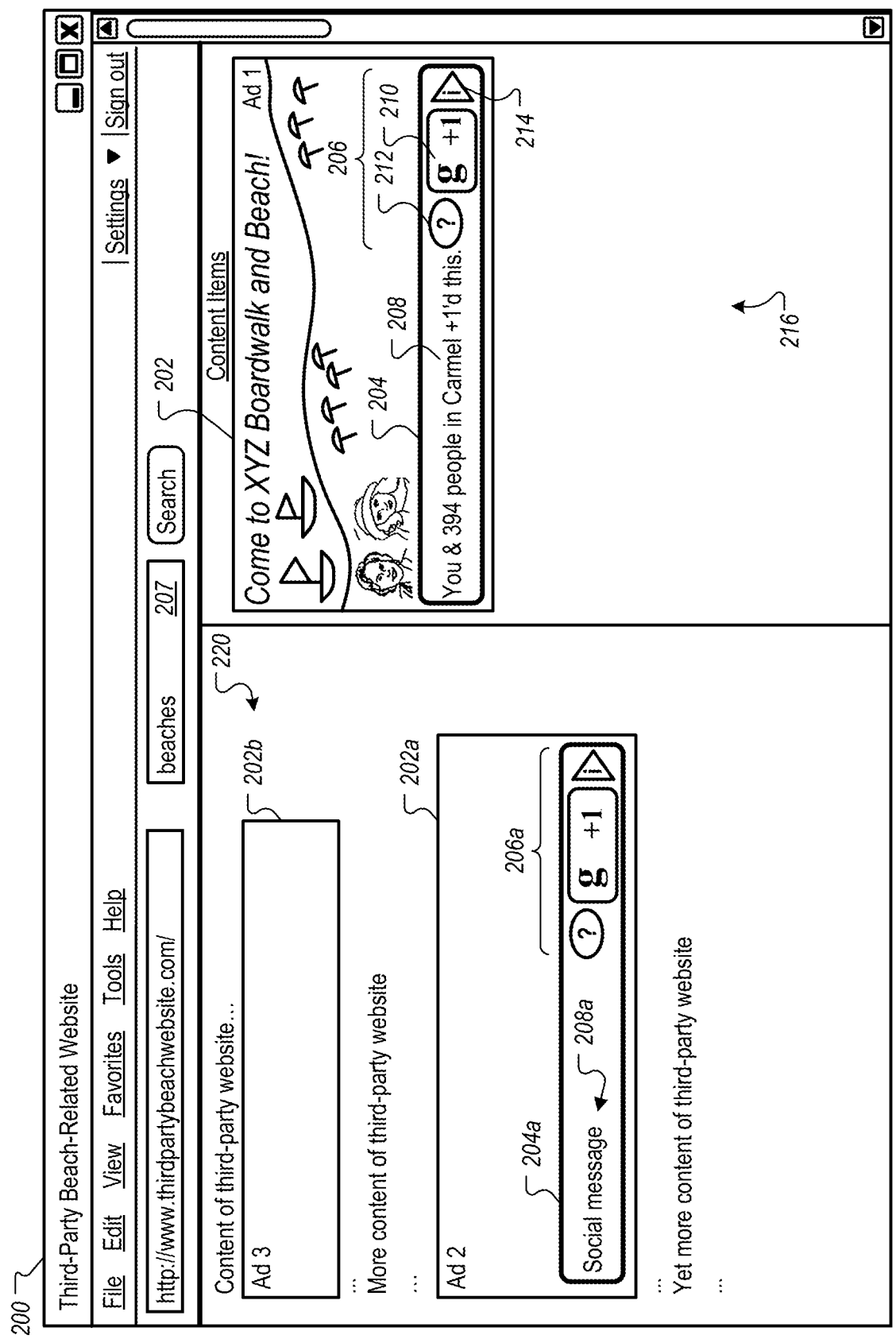
FIG. 4 shows the example user interface of FIG. 2 with the social overlay that is updated to indicate that the user has interacted with the content item.

Example user interfaces for displaying social overlays are described below with reference to FIGS. 2-4. FIGS. 2-4 also illustrate various user interface elements for receiving user data input. Example user interface elements include text boxes, radio buttons, check boxes, drop-down menus, and hypertext links.

FIG. 2 shows an example user interface 200 that includes a content item 202 with a social overlay 204 and a control 206 for re-publishing the content item. For example, a user can use the control 206 to share the content item with one or more members of the user's groups. The user interface 200 can be provided, for example, by the content item management system 110 of FIG. 1. For example, the content item 202 can be a content item that is served with other content, such as included with search results 118 that are responsive to a user's query 116, as described above. In another example, the content item 202 can be any content item that appears on a third-party website, such as the third-party website (e.g., related to area beaches) that is displayed in the user interface 200. For example, the third-party beach-related website can be a landing page associated with one of several search results 118 that are responsive to a search query 207 for "beaches."

The social overlay 204 can serve as an annotation that is associated with the content item 202. The annotation can include customized information related to the user and/or one or more groups that are associated with the user. For example, the social overlay 204 can annotate the content item 202 with information regarding the user's actions associated with the content item 202, or actions by members of one or more groups associated with the user (e.g., the user's circles of friends, family or other groups that are specified or inferred).

When the social overlay 204 is displayed, a social message 208 can provide any of several types of social information associated with the content item. In the example shown in FIG. 2, the social message 208 indicates that "394 people in Carmel+1'd this," meaning that 394 people in the Carmel area have "plussed one" the content item, or shared the content item with others, such as family or friends. In general, a content item being "plussed one" by a user can mean that the user is providing a positive endorsement for the content item. This example provides a summary based on geographic proximity by identifying the number of users in a certain geographic region (e.g., Carmel) who shared the content item. Other example proximity-based summaries include time-based summaries, e.g., the number of users who shared (or liked, etc.) the content item within the last hour (or some other time interval). Regional (e.g., Carmel) and other proximity-based social messages 208 can summarize sharing by people who are not members of the user's groups. Other example types of information that the social message 208 can provide include the number of members in the user's groups who liked the content item, the name of a user's friend who liked the content item, and so on.

In some implementations, the social message 208 can provide statistics related to people in the user's various social groups or circles, such as the members of the user's group who had a favorable response to the content item. For example, the social message 208 can identify the number of the user's family members who liked the content item, or the number of people in the user's circle of friends who shared the content item, to name a few examples. Other example social messages 208 include messages such as "Jerry, your wife+1'd this content item," "David, Roger and 4 more friends shared this content item" or "Peggy and 3 other family members shared this content item."

In some implementations, more than one type of summary message may be applied to a content item, such as a geographically-based summary (e.g., Carmel area) and a user's circle-based summary message (e.g., friends or family). In some implementations, if more than one type of summary message is to be applied to a content item, the user interface 200 can cycle between the different summary messages in the social message 208. For example, the social message 208 that is displayed may alternate between summary messages such as "394 people in Carmel+1'd this," and "14 of your friends liked this content item." In some implementations, the user interface 200 can automatically cycle through summary messages by scrolling through the summary messages that apply to a content item, displaying each in the social message 208. For example, the user interface 200 can display one summary message for a few seconds, then the next summary message, and so on. In some implementations, the social message 208 can include all summary messages at once (e.g., if there are between one and three summary messages). In some implementations, the user interface 200 can include a control by which the user can access the summary messages that apply to a content item. In some implementations, the summary message that is displayed can change to a different applicable summary message if the user hovers over the social message 208 using a position indicator such as a cursor, a pointer, or the touch of a finger or stylus on a touch screen.

The control 206 can include various controls for re-publishing and/or commenting on the content items (e.g., the content item 202 upon which the social overlay 204 is displayed). In this example, the control 206 includes a plus one control 210 for re-publishing or commenting upon the content item, a help control 212, and an information control 214. The plus one control 210 can lead to an interface from which the user can provide detailed information, as will be described below with reference to FIG. 3. By selecting the help control 212, for example, the user can be presented with a popup or other control that provides an explanation of the social overlay 204 and how it is used. As an example, a user who is unfamiliar with re-publishing ads may click on the help control 212 to learn how the interface operates and what can result from the user's interaction with it (e.g., what his friends and family may see). By selecting the information control 214, for example, the user can navigate to a website or other information that provides information on ads.

The content item 202 can be one of several ads that appear in a content items section 216 on the third-party website. Other ads 202a and 202b can appear in a content section 220 of the third-party website. For example, the content item 202a can be another content item that includes a social overlay 204a. In this example, the social overlay 204a includes a control 206a and a social message 208a that can be similar to the control 206 and social message 208 described above.

FIG. 3 shows an example details popup 302 for providing detailed information for re-publishing a content item. The details popup 302 can be displayed, for example, if the user selects the plus one control 210 shown in FIG. 2. The details popup 302 is just one example implementation of an interface that the user can use to provide detailed information for re-publishing a content item (e.g., sharing and/or commenting upon the content item 202) and/or for following a content provider associated with the content item. A header 304 can explain why the details popup 302 is displayed. In this example, the header 304 states that the user plussed-one (or shared) the "XYZ Beach Boardwalk" content item that is the subject of the content item 202, and in this case, the name of the content provider. In some implementations, the name of the content provider can be determined using application code that runs behind the plus one control 210 or the details popup 302, such as at the same time that the application retrieves existing social annotations and user information. In some implementations, if the user is the first person in a social group (e.g., friends, family, etc.) to see the content item 202, or if no one else has re-published or commented upon the content item 202, then a message can indicate to the user that he is the first to re-publish/comment.

The details popup 302 can include a content itemditional actions portion 306 that presents other actions that a user can take with regard to the content item. The addition actions portion 306 includes a republish control 308 and a follow control 310. While there are two controls in this example, there could be a number of additional controls, or the republish control 308 and the follow control 310 could be combined into a single control. For example, activation of the republish control could then present the user with the additional option of also following the content provider. Similarly, if a user activated a single control to follow the content provider, the user could then be presented with an option to also republish the content item.

In some implementations, filtering or limiting of re-publication requests can occur. As a result, the mere designation by a user to re-publish to one or more groups or individuals does not necessarily mean that re-publishing will occur. For example, the designated receivers may have blocked receipt (e.g., by setting preferences in a browser to block all or selected types of social overlays on content and/or ads). In another example, some implementations of the content item management system 110 may filter re-publication requests based on one or more criteria. Example criteria include imposing limits on re-publishing, e.g., limiting the number of re-publishing events, the number of recipients, and so on. In some implementations, imposed limits on re-publishing can be applied to intervals of time, e.g., enforcing a limit of five re-published ads per day, twenty re-published ads per week, and so on. As a result, the content item management system 110 can prevent users from re-publishing too often or to too many people. Other criteria can be used for filtering re-publishing requests.

An email area 322 can identify the user email account 324 (e.g., userX@gmail.com) from which the content item-re-publishing will occur. For example, the email address can be tied to the user's social networking account. In some implementations, a user profile image 326 can provide a visual identification to the user as to what email account 324 is currently displayed. If the user has multiple computer logins and/or email accounts, then the user can use an email change control 328, for example, to select a different one of the user's email accounts (e.g., userX@ABCDmail.com).

As a result of selecting which email account to use, the user is also associating the content item-re-publishing with the groups or social circles that correspond to that user email. For example, the user's circles of family and friends may be vastly different for the social networking accounts associated with the user's email addresses userX@gmail.com versus userX@ABCDmail.com.

A close control 330 can be used to exit the details popup 302 and save the current settings and inputs. In some implementations, a cancel control can exist that can allow the user to exit the details popup 302 without saving any changes, essentially restoring the values of the details popup 302 to their original settings (e.g., before the user displayed the popup).

In some implementation, the details popup 302 can include an option to un-plus the content item, or to cancel the act of re-publishing the content item with others. For example, if the user changes his mind about sharing the content item with family and friends, or decides not to share his comments, the user can select an un-plus option (not shown in FIG. 3), e.g., somewhere inside the details popup 302. In some implementations, selecting the un-plus option can make the social overlay 204 appear in a different way in order to indicate that the content item is no longer shared. For example, while the content item is still displayed after the user has plussed-one the content item and the message reads "You and 394 people in Carmel+1'd this," upon the user un-plussing the content item, the message can return to its original state, namely "394 people in Carmel+1'd this."

FIG. 4 shows the example user interface 200 of FIG. 2 with the social overlay 204 that is updated to indicate that the user has shared the content item 202. In the current example, because the user has shared the content item 202, the social message 208 is now prefaced with "You and . . . " and now reads "You and 394 people in Carmel+1'd this." In some implementations, if additional users (e.g., three more users) in the Carmel area have re-published the content item 202 since the user's act of re-publishing the content item, the social message 208 can update the information (e.g., "You and 297 people in Carmel+1'd this"). The social message 208 can also be updated to show that a user is "following" the content provider associated with the content item 202. In some implementations, other information can be included in the social message 208 if additional activity has occurred (e.g., sharing, following etc.) by one or more other users.

The updated social overlay 204 in FIG. 4 is an example completed loop of events and user actions, starting with the display of the content item 202 that is annotated with the original social overlay 204 and social message 208. Then, as a result of the user re-publishing the content item 202 (e.g., by choosing to "plus one" the content item), the content item 202 is re-published. As a result, the user's social overlay 204 includes a second different annotation (e.g., an updated social message 208, "You and . . . ") along with the re-published content item. Other users can also experience an updated social message 208 that reflects the current user's activity. For example, the social message 208 that the other users see can include an updated count of users who re-published the content item, e.g., "395 people in Carmel+1'd this." The content item management system 110, for example, can produce one or more new social messages 208 for a content item 202 based on actions of one or users in re-publishing the content item 202 (e.g., sharing, commenting, etc.).

Figure 5:
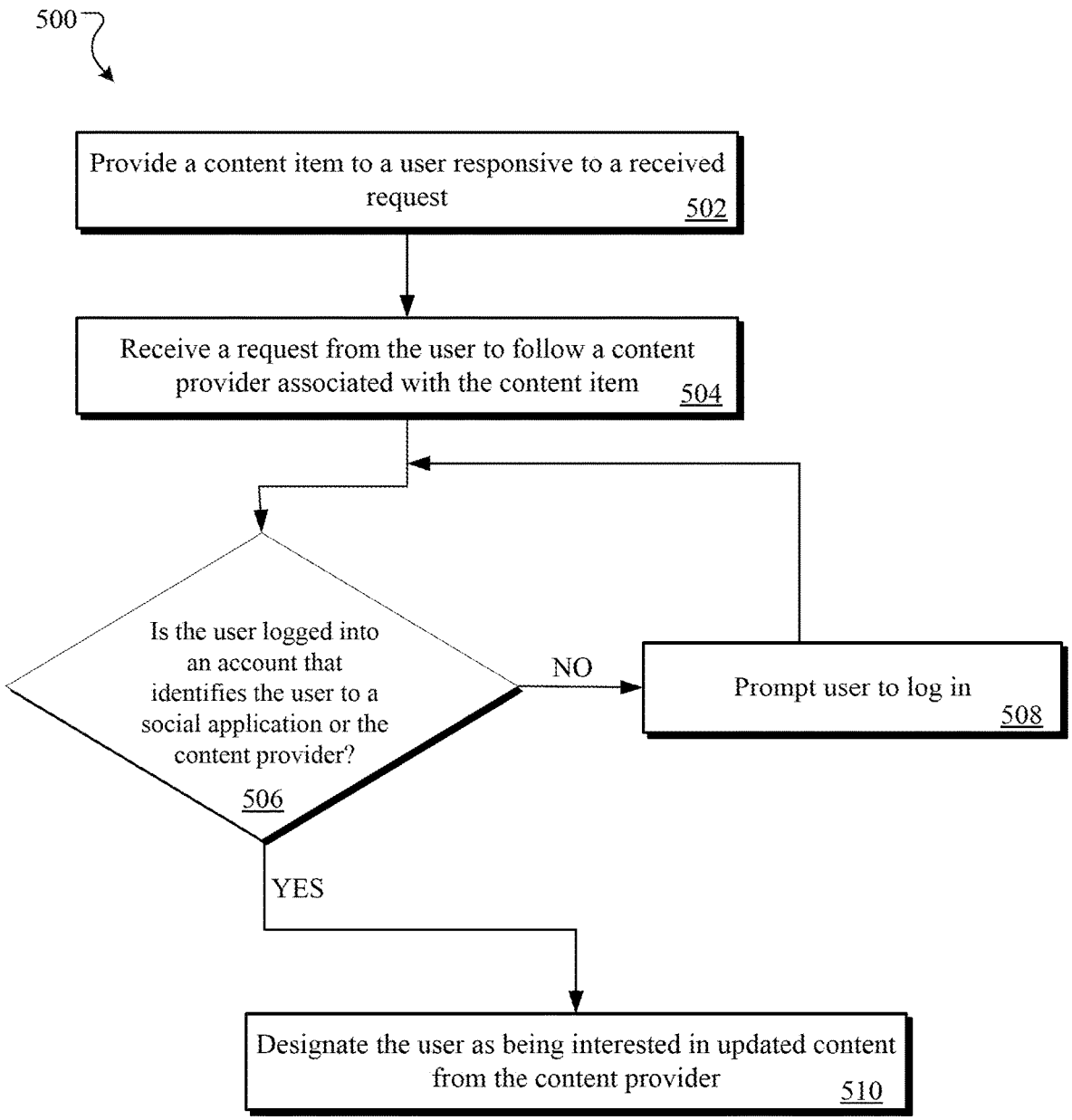
FIG. 5 is a flowchart of an example process for following a content provider.

FIG. 5 is a flowchart of an example process 500 that allows a user to follow a content provider. A content item is provided to a user responsive to a received request (502). For example, when a resource 105 or search results 118 are requested by a user device 106, the content item management system 110 may receive a request for content items to be provided with the resource 105 or search results 118. The request for content items can include characteristics of the content item slots that are defined for the requested resource or search results page, and can be provided to the content item management system 110. The content item management system 110 can provide one or more content items in the content items slots and, as discussed above, the content items can include a social overlay (e.g. social overlay 204 (FIG. 2)) that serves as an annotation for its respective content item. The social overlay 204 may include information for or about republishing the content item and/or following an associated content provider. For example, the social overlay 204 may include a control 206 that can be activated by a user to republish the content item.

A request is received from the user to follow a content provider associated with the content item (504). In some examples, the request to follow the content provider is received by the content item management system 110 as a result of the user activating a control (e.g., the control 206) on the social overlay 204. In some examples, "following" a content provider refers to an establishment of an association between the user (e.g., an account associated with the user) and the content provider, often within a social networking context. For example, a user can be said to be following a content provider if the user submits a request to follow the content provider and, after the request is approved, the user receives electronic updates from the content provider in an activity stream (e.g., a "news feed") on a social networking web site.

A determination is made as to whether the user is logged into an account that identifies the user to either a social application or the content provider (506). For example, before approving the user's request to follow the content provider, the content item management system 110 may perform a check to determine whether the user is logged into an account that adequately identifies the user to an entity or application that will act as the venue in which the user will follow the content provider. For example, if the venue for following a content provider is a social networking web site, the content item management system 110 may perform a check after receiving the request to determine whether the user is logged into an account associated with the social networking site. In some implementations, the account does not necessarily have to reside on (or have been created by) the social networking web site's systems. Instead, the determination may be satisfied if the user is logged into an account that adequately identifies the user to the social networking web site on which the user intends to follow the content provider. For example, if the user is logged into an email account that can be identified by the social networking web site (e.g., if the email account is linked with that user's social networking account for that particular web site), the determination can be satisfied.

If the determination is not satisfied (NO), the user can be prompted to log into or identify a suitable account (508). For example, if the content item management system 110 determines that a user is not logged into an account for a social networking web site, the content item management system 110 can direct the user to a web page at which the user may log in to one or more accounts that will satisfy the determination 506. Prompting the user to log in 508 may also include presenting the user with an option to create a new account that will satisfy the determination 506. After the user has logged into an account, the determination 506 can be performed again.

If the determination is satisfied (YES), the user can be designated as being interested in updated content from the content provider (510). For example, if the user is logged into Account X that is associated with a social networking web site, and the requirements associated with the determination 506 are satisfied by the user's status as being logged into Account X, information about the user can be presented to the social networking web site. In some examples, the content provider that the user is attempting to follow has a presence on the social networking web site, such as a "company profile" (e.g., a user profile that is associated with a business or organization instead of, or in addition to, an individual user).

Designating the user as being interested in updated content can include changing one or more account settings associated with either the user's profile or the company profile such that the user will receive updates released by (or that otherwise concern) the content provider. For example, if the user is designated as being interested in updated content from a content provider, information about the user (e.g., information that identifies the user) can be sent to the social networking web site (or to one or more of the content item management system 110 or the content provider). The content provider and/or the social networking web site can use the information to enable the user to receive press releases, coupons, special offers, and other announcements from the content provider. In some implementations, the user may receive the updates in the form of a news item in an activity stream associated with a user on the social networking web site. In some examples, an activity stream aggregates, organizes, and displays information disseminated by other users and organizations. For example, a user's activity stream may display, in chronological order, a variety of press releases from content providers that the user is following. Example activity streams can include a wall, a tweet, a chat message, a news stream, and the like. An activity stream may be provided by a social server system for one or more users and can show recent updates posted by the one or more users. In some examples, an activity stream can be produced by a social application executing on one or more server computers and can be published for consumption by one or more subscribers to the social application that have been designated by the user as being authorized to receive the update.

In order to enable the user to receive the updated content from the content provider, the information about the user can be used to add the user to a list of users who will receive the updated content (e.g., a distribution list). In some examples, users who are following a content provider can follow updates associated with that content provider in the form of Short Message Service (SMS) messages, emails, physical mailings, and other forms of communication.

Figure 6:
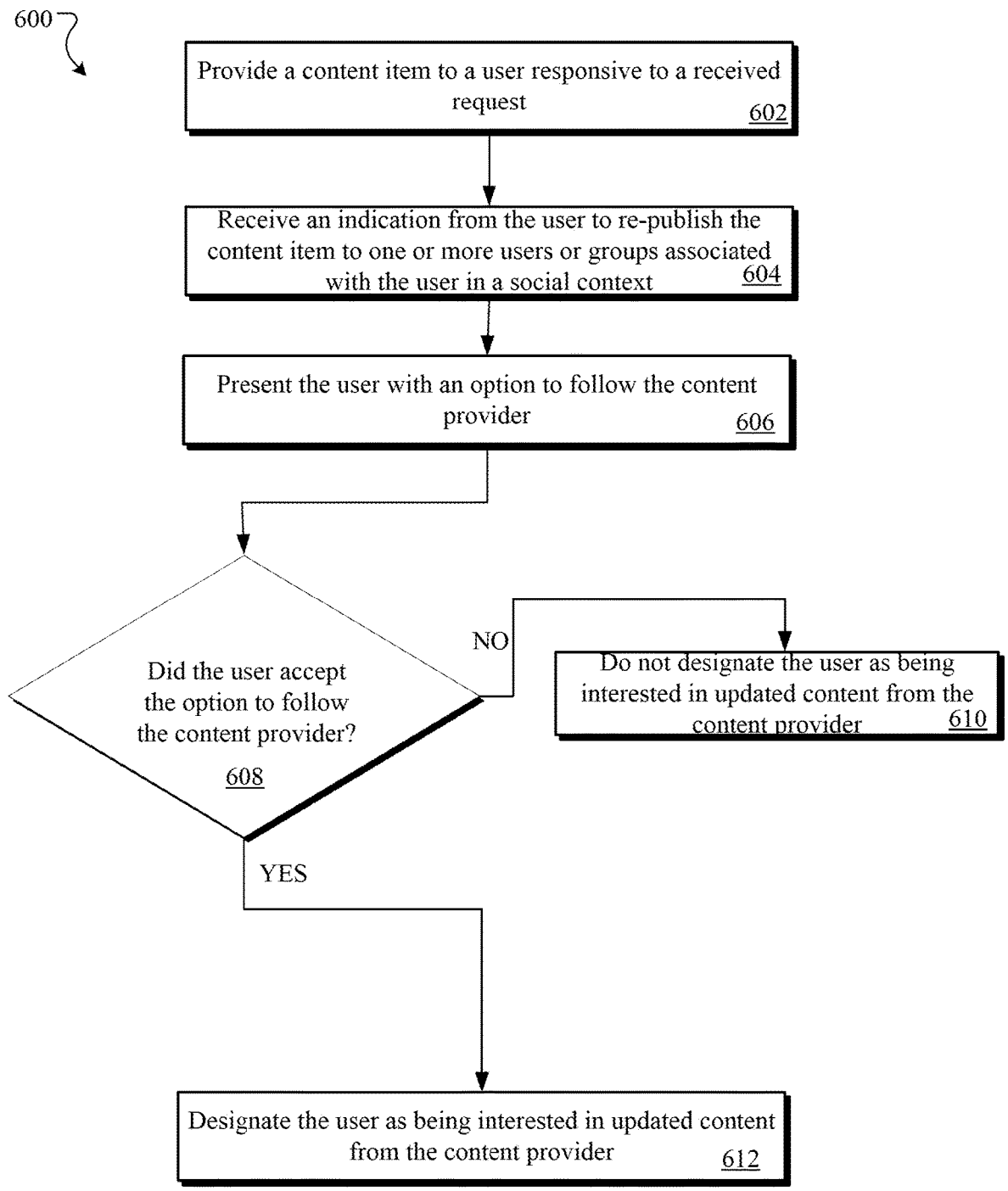
FIG. 6 is a flowchart of an example process for following a content provider.

FIG. 6 is a flowchart of an example process 600 that allows a user to follow a content provider. A content item is provided to a user responsive to a received request (602). For example, when a resource 105 or search results 118 are requested by a user device 106, the content item management system 110 may receive a request for content items to be provided with the resource 105 or search results 118. The request for content items can include characteristics of the content item slots that are defined for the requested resource or search results page, and can be provided to the content item management system 110. The content item management system 110 can provide one or more content items in the content items slots and, as discussed above, in some implementations, the content items can include a social overlay (e.g. social overlay 204 (FIG. 2)) that serves as an annotation for its respective content item.

An indication is received from the user to republish the content item to one or more users or groups associated with the user or to follow the content provider in a social context (604). For example, the social overlay 204 may include information for or about republishing the content item, such as a control 206 that can be activated by a user to republish the content item and/or follow the content provider. In some examples, a user can use the control 206 to share the content item with one or more members of the user's groups in a social context such as a social networking web site. Re-publishing the content item may cause the content item (or other information associated with the content provider) to appear in the activity streams of one or more of the user's friends, family members, colleagues, or other contacts on the social networking web site.

The user can be presented with an option to follow the content provider (606). For example, after receiving an indication from the user to re-publish the content item, the content item management system 110 can present the user with an option to follow the content provider. In some examples, the option can be presented in the form of a dialogue box or other web control, or by sending a communication to the user (such as an email or SMS message) that asks the user whether he would like to follow the content provider associated with the content item that the user republished.

A determination is made as to whether the user accepted the option to follow the content provider (608). For example, the content item management system 110 may wait for a response to the presented option to follow the content provider. In some examples, the content item management system 110 may determine that the user has declined the option upon the expiration of a period of time (e.g., if the option was sent in an email to the user, the content item management system 110 may determine that the option was declined after thirty days).

If the user does not accept the option (NO), the user is not designated as being interested in updated content from the content provider (610). In this case, the user would not be added to a list of users who are following the content provider, and will not receive updates in their activity streams (or other notifications) that relate to updated content from or about the content provider. In some examples, if a user has declined the option to follow a content providers a threshold number of times, the content item management system 110 may refrain from automatically presenting the option to the user in future instances in which the user republishes content items associated with that content provider, and may instead require that the user take a different action to follow the content provider.

If the user accepts the option to follow the content provider (YES), the user is designated as being interested in updated content from the content provider (610). As discussed above with regard to FIG. 5, designating the user as being interested in updated content can include changing one or more account settings associated with either the user's profile or the company profile such that the user will receive updates released by (or that otherwise concern) the content provider. For example, if the user is designated as being interested in updated content from a content provider, information about the user (e.g., information that identifies the user) can be sent to the social networking web site (or to one or more of the content item management system 110 or the content provider). The content provider and/or the social networking web site can use the information to enable the user to receive press releases, coupons, special offers, and other announcements from the content provider. The user may receive the updates in the form of a news item in an activity stream associated with the user on the social networking web site.

In order to enable the user to receive the updated content from the content provider, information about the user can be used to add the user to a list of users who will receive the updated content (e.g., a distribution list). In some examples, users who are following a content provider can follow updates associated with that content provider in the form of Short Message Service (SMS) messages, emails, physical mailings, and other forms of communication.

Figure 7:
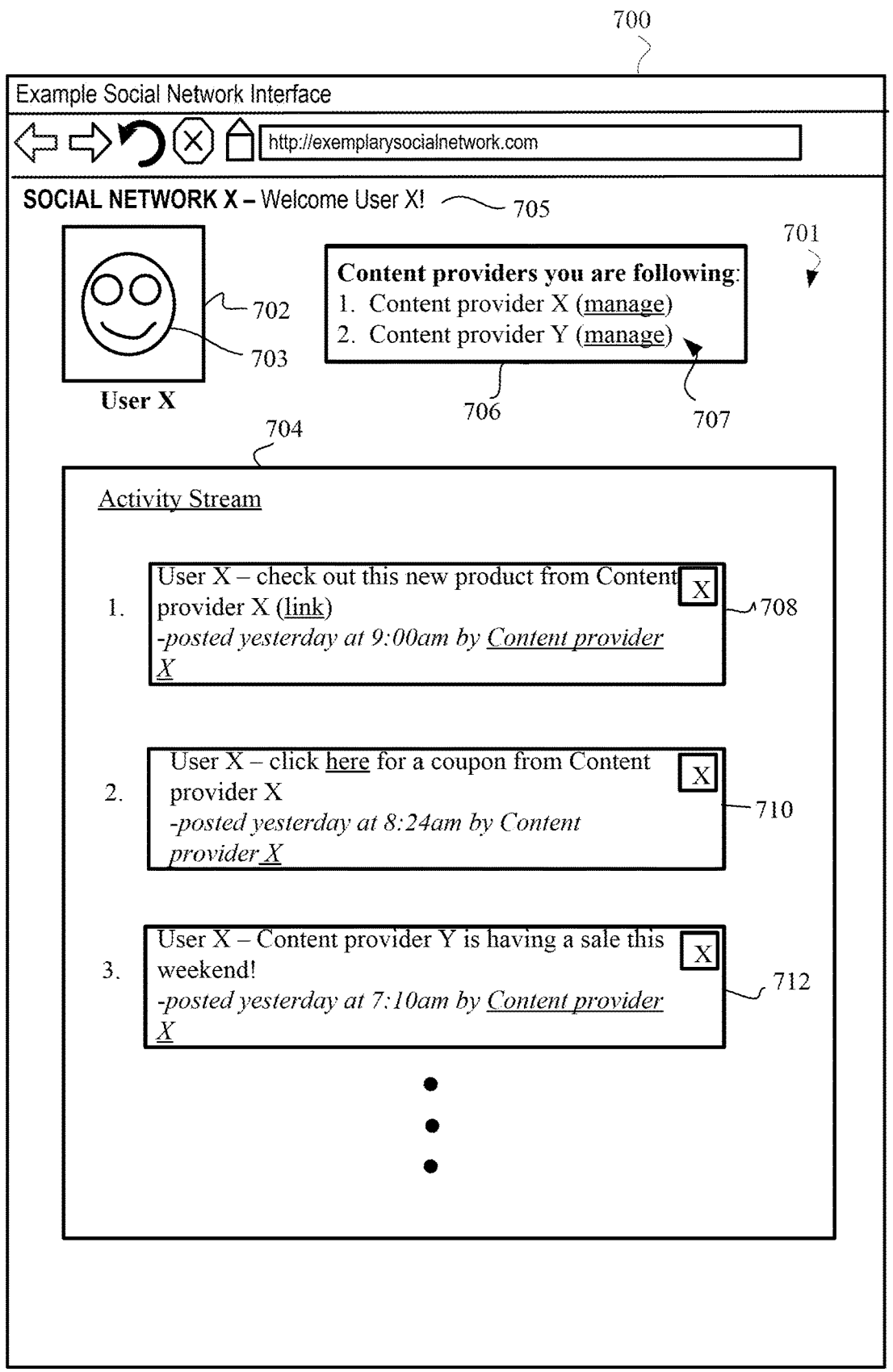
FIG. 7 shows an example user interface that is displaying a social network web page for a user.

FIG. 7 shows an exemplary user interface 700 that displays a social network web page 701 for Social Network X. The social network web page 701 is associated with a profile for a user 702 ("User X"). The association between the social network web page 701 and the user 702 can be demonstrated by providing a picture 703 of the user 702. The social network web page 701 can also include a message 705 that welcomes the user 702 (e.g., "Welcome User X!").

In the example of FIG. 7, the user 702 is following a number of content providers (e.g., the user has submitted a request to follow social network profiles associated with the content providers). The content providers currently being followed by the user 702 can be displayed in a content provider status window 706. For example, the content provider status window 706 shows that the user 702 is following both Content provider X and Content provider Y. The content provider status window can also provide one or more controls 707 that allow the user to manage which content providers he is following, and the amount, frequency, and type of updates he would like to receive from those content providers. In this example, the control 707 is presented as a hyperlink next to each content provider which the user 702 is following.

As discussed above, updates from content providers that the user 702 is following can be displayed in an activity stream 704 associated with the user's 702 social network profile or account. In this example, the activity stream 704 presents updates 708 and 710 that are associated with Content provider X, and also presents and update 712 that is associated with Content provider Y. Update 708 from Content provider X provides the user 702 with an opportunity to view a new product associated with Content provider X by posting a hyperlink to a product page in the activity stream 704 (where the user 702 may click on the hyperlink to view the product page). Update 710 provides a coupon to the user 702 from Content provider X, also in the form of a hyperlink that can be activated by the user 702. Update 712 includes a notification from Content provider Y about an upcoming sale.

If the activity stream 704 is visible to other users (e.g., contacts of the user 702 on Social Network X), users other than user 702 may be able to view and/or interact with the updates 708, 710, 712 in the user's 702 activity stream 704. For example, a contact of the user 702 may view the user's activity stream 704 and access the coupon provided in the update 710 from Content provider X. If users other than the user 702 interact with updates from a sponsor (e.g., the update 710), those users can also be presented with an option to republish the update 710 to their own activity streams and/or follow the content provider associated with the update 710. In some examples, if a new user clicks on an update presented in a different user's activity stream, a process similar to the processes 500, 600 can be initiated in order to provide the new user with an opportunity to follow and/or republish updates from content providers.

Systems, such as the content item management system 110, may use information about the user 702 to target content to the user 702 or to other users with one or more similar characteristics. For example, the content item management system 110 can target content items to users based on which content providers the users are following. The content item management system 110 can also use information about which content providers the users are following in order to alter search results that the user will receive after submitting a query to a search engine. Altering the search results can include determining a context for queries entered by the user. For example, if the user is following a number of content providers that are in the automobile industry, if that user enters a query for "jaguars" into a search engine, the search engine could be configured to favor search results related to the Jaguar Cars Ltd.® car company over search results related to the animals of the same name.

Figure 8:
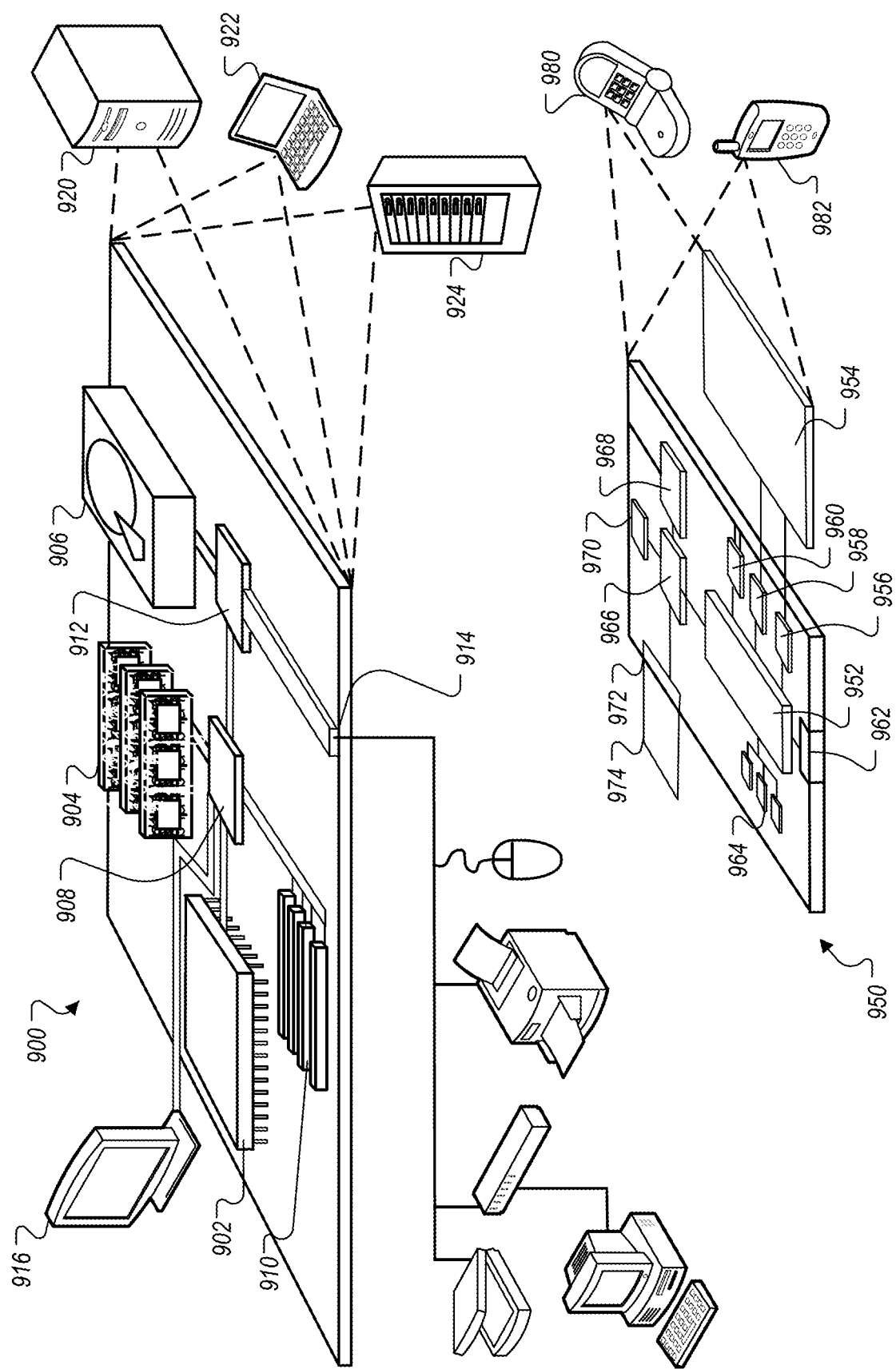
FIG. 8 shows an example computing system.

FIG. 8 is block diagram of an example computer system 900 that can be used to implement the methods, systems and processes described in this disclosure. The system 900 includes a processor 910, a memory 920, a storage device 930, and an input/output device 940. Each of the components 910, 920, 930, and 940 can be interconnected, for example, using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can include, for example, a hard disk device, an optical disk device, or some other large capacity storage device.

The input/output device 940 provides input/output operations for the system 900. In one implementation, the input/output device 940 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

The content item management system 110 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium.

Although an example processing system has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a request for a content item for display on a website and to a user;
selecting, based on the user and on the website, a content item from among one or more content items;
based on a social network that is different from the website and that includes (i) first social networking data that indicates social network friends of the user and (ii) second social networking data that indicates users who have expressed interest in the content item, generating a social overlay that includes a selectable control that, upon selection by the user when presented on the website, updates the social network to indicate that the user expressed interest in the content item from outside of the social network;
receiving, from the user, a selection of the selectable control;
in response to the selection of the selectable control by the user, providing, for display on the website, a dialog box that includes a selectable follow control that, upon selection by the user, updates the social network to indicate that the user follows a content provider associated with the content item;
generating a combined content item that includes the social overlay that is overlaid on the content item; and
outputting, for display on the website that is different from the social network, the combined content item.

2. The method of claim 1, comprising:
determining a number of users within a social network of the user who have expressed interest in the content item from outside the social network,
wherein the social overlay includes the number of users within the social network of the user who have expressed interest in the content item from outside the social network.

3. The method of claim 1, comprising:
determining a geographic location of the user; and
determining a number of users of the social network who are within a threshold distance of the geographic location of the user and who have expressed interest in the content item from outside the social network,
wherein the social overlay includes the number of users of the social network who are within the threshold distance of the geographic location of the user and who have expressed interest in the content item from outside the social network.

4. The method of claim 1, comprising:
receiving, from the user, a selection of the selectable control; and
in response to the selection of the selectable control by the user, updating the social overlay to indicate that the user has expressed interest in the content item from outside the social network.

5. The method of claim 1, comprising
receiving, from the user, a selection of the selectable follow control; and
in response to receiving the selection of the selectable follow control, updating the social network to indicate that the user follows the content provider associated with the content item.

6. The method of claim 1, comprising:
receiving, from the user, a selection of the selectable follow control;
in response to receiving the selection of the selectable follow control, determining that the user is not logged into the social network; and
based on determining that the user is not logged into the social network, preventing the social network from updating to indicate that the user follows the content provider associated with the content item.

7. The method of claim 1, wherein the dialog box includes an additional control, that upon selection by the user, updates the social network differently than indicating that the user follows the content provider associated with the content item.

8. A system comprising:
one or more computers and one or more storage devices storing instructions that are operable, when executed by the one or more computers, to cause the one or more computers to perform operations comprising:
receiving a request for a content item for display on a website and to a user;
selecting, based on the user and on the website, a content item from among one or more content items;
based on a social network that is different from the website and that includes (i) first social networking data that indicates social network friends of the user and (ii) second social networking data that indicates users who have expressed interest in the content item, generating a social overlay that includes a selectable control that, upon selection by the user when presented on the website, updates the social network to indicate that the user expressed interest in the content item from outside of the social network;
receiving, from the user, a selection of the selectable control; and
in response to the selection of the selectable control by the user, providing, for display on the website, a dialog box that includes a selectable follow control that, upon selection by the user, updates the social network to indicate that the user follows a content provider associated with the content item;
generating a combined content item that includes the social overlay that is overlaid on the content item; and
outputting, for display on the website that is different from the social network, the combined content item.

9. The system of claim 8, wherein the operations further comprise:
determining a number of users within a social network of the user who have expressed interest in the content item from outside the social network,
wherein the social overlay includes the number of users within the social network of the user who have expressed interest in the content item from outside the social network.

10. The system of claim 8, wherein the operations further comprise:
determining a geographic location of the user; and
determining a number of users of the social network who are within a threshold distance of the geographic location of the user and who have expressed interest in the content item from outside the social network,
wherein the social overlay includes the number of users of the social network who are within the threshold distance of the geographic location of the user and who have expressed interest in the content item from outside the social network.

11. The system of claim 8, wherein the operations further comprise:
receiving, from the user, a selection of the selectable control; and
in response to the selection of the selectable control by the user, updating the social overlay to indicate that the user has expressed interest in the content item from outside the social network.

12. The system of claim 8, wherein the operations further comprise
receiving, from the user, a selection of the selectable follow control; and
in response to receiving the selection of the selectable follow control, updating the social network to indicate that the user follows the content provider associated with the content item.

13. The system of claim 8, wherein the operations further comprise:
receiving, from the user, a selection of the selectable follow control;
in response to receiving the selection of the selectable follow control, determining that the user is not logged into the social network; and
based on determining that the user is not logged into the social network, preventing the social network from updating to indicate that the user follows the content provider associated with the content item.

14. The system of claim 8, wherein the dialog box includes an additional control, that upon selection by the user, updates the social network differently than indicating that the user follows the content provider associated with the content item.

15. A non-transitory computer-readable medium storing software comprising instructions executable by one or more computers which, upon such execution, cause the one or more computers to perform operations comprising:
receiving a request for a content item for display on a website and to a user;
selecting, based on the user and on the website, a content item from among one or more content items;
based on a social network that is different from the website and that includes (i) first social networking data that indicates social network friends of the user and (ii) second social networking data that indicates users who have expressed interest in the content item, generating a social overlay that includes a selectable control that, upon selection by the user when presented on the website, updates the social network to indicate that the user expressed interest in the content item from outside of the social network;
receiving, from the user, a selection of the selectable control; and
in response to the selection of the selectable control by the user, providing, for display on the website, a dialog box that includes a selectable follow control that, upon selection by the user, updates the social network to indicate that the user follows a content provider associated with the content item;
generating a combined content item that includes the social overlay that is overlaid on the content item; and
outputting, for display on the website that is different from the social network, the combined content item.

16. The medium of claim 15, wherein the operations further comprise
receiving, from the user, a selection of the selectable follow control; and
in response to receiving the selection of the selectable follow control, updating the social network to indicate that the user follows the content provider associated with the content item.

17. The medium of claim 15, wherein the operations further comprise:
receiving, from the user, a selection of the selectable follow control;

in response to receiving the selection of the selectable follow control, determining that the user is not logged into the social network; and based on determining that the user is not logged into the social network, preventing the social network from updating to indicate that the user follows the content provider associated with the content item.

* * * * *